(12) United States Patent
Orihara

(10) Patent No.: US 9,268,700 B2
(45) Date of Patent: Feb. 23, 2016

(54) CACHE CONTROL DEVICE, CACHE CONTROL METHOD, AND PROGRAM THEREOF

(71) Applicant: NEC Corporation, Minato-ku, Tokyo (JP)

(72) Inventor: Naoshi Orihara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 231 days.

(21) Appl. No.: 13/865,670

(22) Filed: Apr. 18, 2013

(65) Prior Publication Data

US 2013/0282977 A1 Oct. 24, 2013

(30) Foreign Application Priority Data

Apr. 19, 2012 (JP) ................. 2012-095558

(51) Int. Cl.
*G06F 13/12* (2006.01)
*G06F 12/08* (2006.01)

(52) U.S. Cl.
CPC ........ *G06F 12/0868* (2013.01); *G06F 12/0866* (2013.01); *G06F 12/0864* (2013.01); *G06F 12/0897* (2013.01)

(58) Field of Classification Search
CPC ............ G06F 12/0866; G06F 12/0897; G06F 12/0868
USPC ........................................................ 711/113
See application file for complete search history.

(56) References Cited

U.S. PATENT DOCUMENTS

2001/0008009 A1* 7/2001 Johnson ......................... 711/128
2006/0174156 A1* 8/2006 Balasubramanian ............. 714/6

FOREIGN PATENT DOCUMENTS

| JP | S62-22162 A | 1/1987 |
|----|----|----|
| JP | H4-148225 A | 5/1992 |
| JP | H9-212423 A | 8/1997 |
| JP | H10-31622 A | 2/1998 |
| JP | H11-259361 A | 9/1999 |
| JP | 2000-10860 A | 1/2000 |
| JP | 2001-166993 A | 6/2001 |
| JP | 2004-213647 A | 7/2004 |
| JP | 2005-165528 A | 6/2005 |
| JP | 2006-99802 A | 4/2006 |
| JP | 2007-58349 A | 3/2007 |
| JP | 2008-59057 A | 3/2008 |
| JP | 2008-217527 A | 9/2008 |
| JP | 2008-234490 A | 10/2008 |
| JP | 2009-129440 A | 6/2009 |
| JP | 2009-211226 A | 9/2009 |
| JP | 2011-204060 A | 10/2011 |
| JP | 2012-14435 A | 1/2012 |

OTHER PUBLICATIONS

Japanese Office Action for JP Application No. 2012-095558 mailed on Apr. 8, 2014 with English Translation.

* cited by examiner

*Primary Examiner* — Jae Yu

(57) ABSTRACT

To prevent an increase in the management information and to increase the capacity of a secondary cache. The cache control device includes: a secondary cache having the data of the data sector and management information; and a primary cache having a digest value calculated from the address of the data and secondary management information. A controller includes: a digest value calculation unit which calculates the digest value of the data when reading out the data; a management information searching unit which searches the management information in the primary cache based on the digest value; and a readout control unit which specifies the data sector in the secondary cache based on the management information and reads out the data.

18 Claims, 10 Drawing Sheets

FIG.5

■ L2PAGE INFORMATION (16byte)　　　　　　　　　　　　L2PAGE

|   | 0 | 1 | 2 | 3 | 4 | 5 | 6 | 7 |
|---|---|---|---|---|---|---|---|---|
| 0 | LOGIC DISK # | | (STATE) | GENE-RATION | RESERVATION | | | |
| 0 | LOGIC SECTOR # | | | | | | | |

■ L2UNIT INFORMATION (512byte)　　　　　　　　　　　　L2UNIT

|     | 0 | 1 | 2 | 3 | 4 | 5 | 6 | 7 |
|-----|---|---|---|---|---|---|---|---|
| 0   | L2PAGE #0 (16byte) | | | | | | | |
| 8   | | | | | | | | |
| 16  | L2PAGE #1 (16byte) | | | | | | | |
| 24  | | | | | | | | |
| 32  | L2PAGE #2 (16byte) | | | | | | | |
| 40  | | | | | | | | |
| ... | ... | | | | | | | |
| 496 | L2PAGE #31 (16byte) | | | | | | | |
| 504 | | | | | | | | |

FIG.6
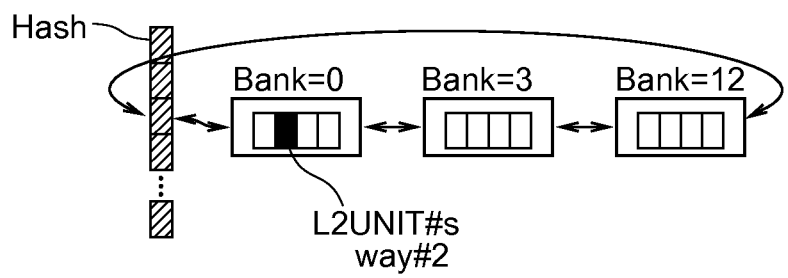
■ PRIMARY CACHE 18
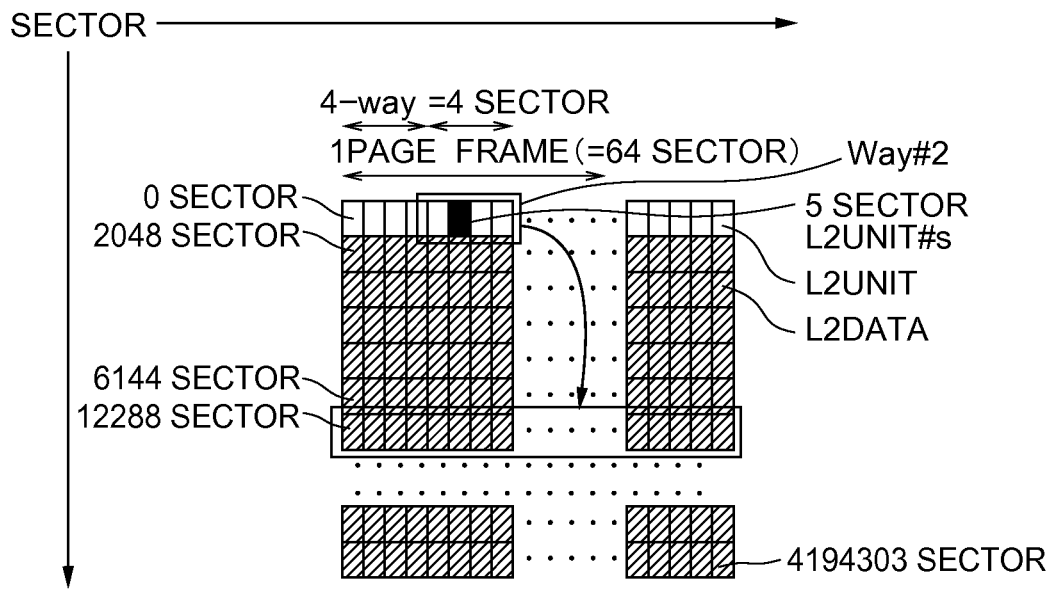
■ SECONDARY CACHE 20 Bank=0

CACHE CONTROL DEVICE, CACHE CONTROL METHOD, AND PROGRAM THEREOF

CROSS-REFERENCE TO RELATED APPLICATION

This application is based upon and claims the benefit of priority from Japanese patent application No. 2012-095558, filed on Apr. 19, 2012, the disclosure of which is incorporated herein in its entirety by reference.

BACKGROUND OF THE INVENTION

1. Field of the Invention

The present invention relates to a cache control device, a cache control method, and a program thereof. More specifically, the present invention relates to a cache control device using a secondary cache having a large capacity, a cache control method, and a program thereof.

2. Description of the Related Art

A hard disk drive (HDD) is used as an external storage device of a computer system, and a disk array device that provides services such as speedup and duplication by combining a plurality of HDDs is also used.

With a disk device and a disk array device, the performance of I/O (input/output) can be improved when a part of the memory loaded on those external storage devices is used as a disk cache. Further, when the disk cache capacity is added up to increase the usability thereof, the performance of the disk array device and the like can be improved.

However, the memory loaded on the disk array device and the like is of a smaller amount compared to the total capacity of HDD managed in a memory disk array and the like. There is also a limit in the port, for example, for physically loading the memory when adding on the memory, so that there is a limit in increasing the capacity.

Recently, focused as a means for increasing the disk cache capacity is a performance improving method achieved by controlling I/O with the use of a storage medium (e.g., SSD: solid state disk) which is cheaper and has a larger capacity than the memory and is also higher in speed than HDD.

Further, SSD has such characteristics that data therein is managed with a unit of 4 KB and that erase processing is required with a unit of 256 KB, etc. In order to use SSD for the disk cache, a cache control method suited for such characteristics has been investigated.

Regarding the cache control, following technical documents Japanese Unexamined Patent Publication 2007-58349 (Patent Document 1), Japanese Unexamined Patent Publication 2008-059057 (Patent Document 2), Japanese Unexamined Patent Publication 2009-211226 (Patent Document 3), and Japanese Unexamined Patent Publication 2012-14435 (Patent Document 4) are known.

Disclosed in Patent Document 1 is a method for controlling N-way set associative control in which N-pieces of tags are provided for a plurality of cache lines (paragraphs [0003] to [0007]). Further, also disclosed is a method for improving the performance through simplifying the cache control actions by omitting invalid processing for a primary cache at the time of replacing data of a secondary cache (non-inclusive in paragraphs [0018], [0010]).

Disclosed in Patent Document 2 is a method which has data loaded to a sharing cache (secondary cache) in advance from a main memory in order to effectively perform prefetching (preloading) according to the state of the cache line (paragraph [0024]). Further, also disclosed is an example of the structure with which a secondary cache management table for managing the storage state of the secondary cache memory and the prefetch requests is stored not in the secondary cache but in a prefetch control unit (paragraphs [0046], [0047], FIG. 1).

Disclosed in Patent Document 3 is a method (paragraph [0070], FIG. 11) which manages tags in a unit of cluster in order to minimize the volume of the management table such as changes in addresses as much as possible when using a flash memory such as SSD as a cache with a large capacity.

Disclosed in Patent Document 4 is a method which restores data stored in a secondary cache such as SSD but not stored in HDD by using a restoring tool in order to restore the data of the secondary cache or the like to HDD after a crash even when the data is not written in the HDD (FIG. 5, paragraphs 0043 to 0045 and the like). Further, in this case, disclosed is an example of the structure which stores management information of the secondary cache in the main memory (paragraphs [0023], [0035], FIG. 1).

Further, there are descriptions regarding a primary and a secondary cache memories in Japanese Unexamined Patent Publication 2008-217527 (Patent Document 5), and disclosed therein is a technical content where a volatile memory is used as the secondary cache memory in order to speed up input/output of data.

Furthermore, there are also descriptions regarding a primary and a secondary cache memories in Japanese Unexamined Patent Publication 2011-204060 (Patent Document 6), and disclosed therein is a technical content where SSD is used as the secondary cache memory and the durability is increased.

However, each of the above-described documents discloses nothing regarding a technical method for preventing the increase in the management information of the secondary cache due to the large capacity (including add-on and the like) and exhibiting the original performance of having the large capacity.

That is, it is not possible to manage the secondary cache having the large capacity at a high speed with the techniques of each of the above-described Patent Documents 1 to 6 and combinations thereof.

Particularly, when using a storage medium such as SSD which is faster than HDD but slower than a memory as the secondary cache, the access frequency influences the performance. Thus, with the related technique described above, it is difficult to increase the capacity while securing the performance.

It is therefore an exemplary object of the present invention to provide a cache control device, a cache control method, and a program thereof, which can increase the capacity of the secondary cache by suppressing the increase of the management information when using a storage medium of about a medium speed that is faster than a disk unit (HDD or the like) and slower than a memory as the secondary cache.

SUMMARY OF THE INVENTION

In order to achieve the foregoing object, the cache control device according to an exemplary aspect of the invention includes: a memory including a primary cache of a disk unit that stores data; a storage medium including a secondary cache for the primary cache, which is of a larger capacity and a lower speed than the memory; and a controller for controlling transfer of the data using the primary cache and the secondary cache.

The secondary cache includes a data sector which stores the data by having a sector of a predetermined capacity as a unit, and a management information sector which stores management information containing addresses of a plurality of the data sectors. Further, the primary cache connects and stores a digest value calculated from the address of the data and the management information containing the address of the data sector in the secondary cache to which the data is cached.

Furthermore, the controller includes: a digest value calculation unit which calculates the digest value of the data when reading out the data; a management information searching unit which searches the management information in the primary cache based on the digest value; and a readout control unit which specifies the data sector in the secondary cache based on the management information and reads out the data.

In order to achieve the foregoing object, the cache control method according to another exemplary aspect of the invention is a cache control method which controls caching by using the cache control device wherein: a digest value calculation unit of the controller first calculates the digest value of the data when reading out the data; a management information searching unit then searches the management information in the primary cache based on the calculated digest value and gives it to a readout control unit; and a readout control unit thereafter specifies the data sector in the secondary cache based on the management information and reads out the data.

In order to achieve the foregoing object, the cache control program according to still another exemplary aspect of the invention causes the controller of the cache control device to execute: a digest value calculation procedure which calculates the digest value of the data when reading out the data; a management information searching procedure which searches the management information in the primary cache based on the calculated digest value; and a readout control procedure which specifies the data sector in the secondary cache based on the management information and reads out the data.

BRIEF DESCRIPTION OF THE DRAWINGS

FIG. 5 is an explanatory chart showing an example of the data structure of the management information;

FIG. 6 is an explanatory chart showing an example where the secondary cache is a 4-way set associative type;

DETAILED DESCRIPTION OF THE PREFERRED EMBODIMENTS

Figure 1:
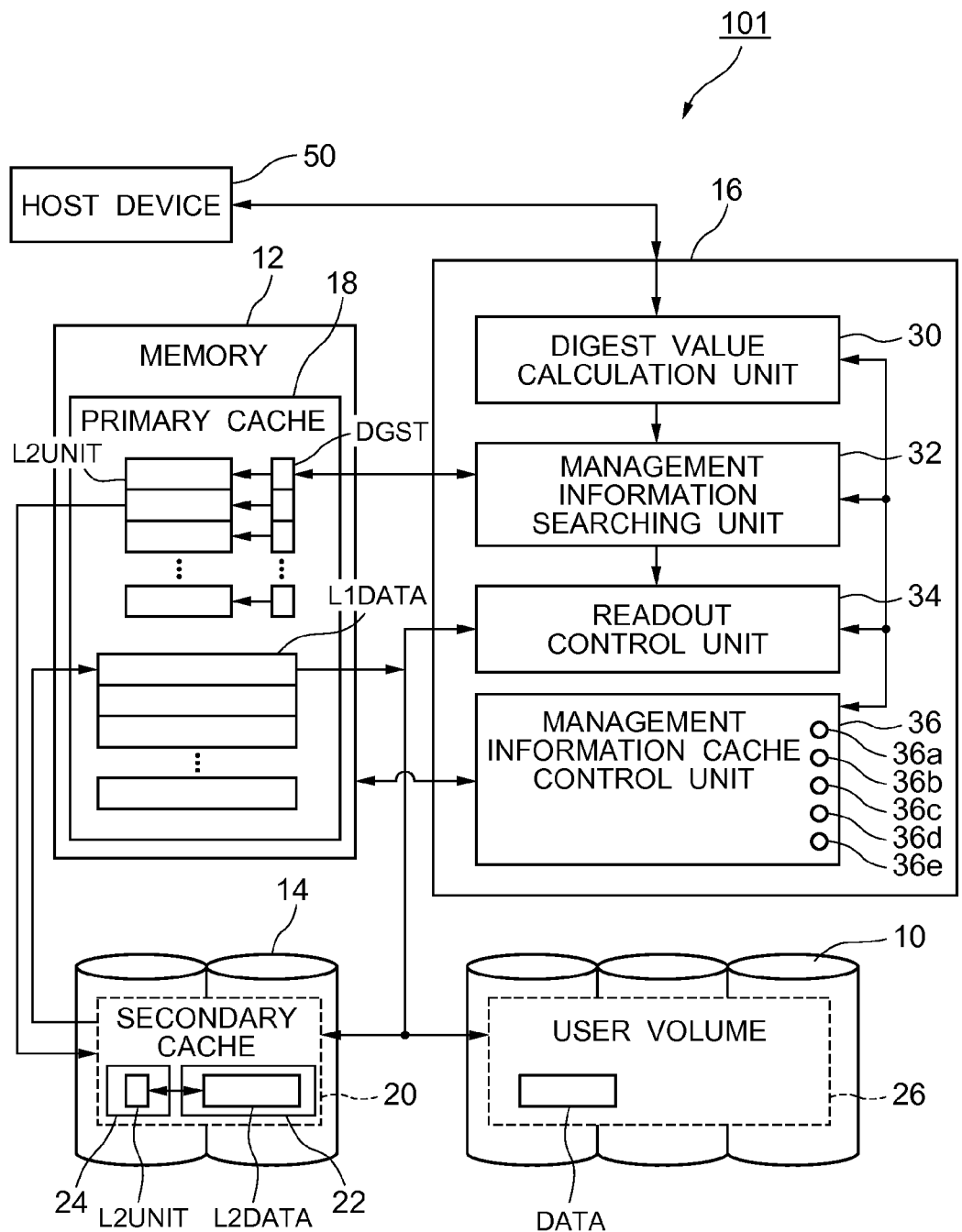
FIG. 1 is a block diagram showing an example of the structure of a first exemplary embodiment of the present invention.

Hereinafter, a first exemplary embodiment of a cache control device according to the present invention will be described by referring to FIG. 1 to FIG. 7. The outline of the overall structure will be described first, and a specific embodiment thereof will be described thereafter.

(Overall Structure)

First, a cache control device 101 according to the first exemplary embodiment is in many cases used for an external storage device (disk unit 10) such as a disk array device 10.

In that case, the disk array device 10 stores data transmitted from a host device 50 such as a computer, and transmits the data to the host device 50 according to a request from the host device 50. The disk array device 10 stores the data to a hard disk drive (HDD).

Note here that I/O to/from HDD is slower than the information processing speed of the host device 50. Thus, the waiting time of I/O of the host device 50 can be shortened by using a memory 12 that is capable of transferring data at a higher speed as the cache.

The cache control device 101 includes: the memory 12 having a primary cache 18 of the disk unit 10 which stores the data; a storage medium 14 having a secondary cache 20 for the primary cache 18, which has a larger capacity and is a lower speed than the memory 12; and a controller 16 which controls transfer of the data using the primary cache 18 and the secondary cache 20. Further, the secondary cache 20 includes: data sectors 22 for storing the data by having a sector of a predetermined capacity as a unit; and management information sectors 24 for storing management information L2UNIT including addresses of a plurality of data sectors 22 mentioned above.

Further, the primary cache 18 connects and stores digest values DGST (Hash information) calculated from the addresses of the data and the management information L2UNIT including the addresses of the data sectors 22 in the secondary cache 20 to which the data is cached.

Further, the controller 16 includes: a digest value calculation unit 30 which calculates the digest values DGST of the data when reading out the data; a management information searching unit 32 which searches the management information L2UNIT in the primary cache 18 based on the digest values DGST; and a readout control unit 34 which reads out the data L2DATA by specifying the data sector 22 of the secondary cache 20 from the management information L2UNIT.

Thereby, even when the secondary cache 20 is of a large capacity, it is possible to search the management information L2UNIT in the primary cache 18 at a high speed since the management information L2UNIT of the secondary cache 20 is recorded to the primary cache 18.

Further, the above-described controller 16 includes a management information cache control unit 36 which caches the management information L2UNIT of the secondary cache 20 to the primary cache 18 as the target of the cache control. Thereby, the access frequency for the secondary cache 20 can be decreased.

Furthermore, the management information cache control unit 36 includes: a storage control function 36a which reads out the management information L2UNIT from the secondary cache 20, connects the management information L2UNIT to the digest value DGST, and stores them in the primary cache 18 when the management information L2UNIT is not cached to the primary cache 18 when reading out the data; and an exchange control function 36b which exchanges the old management information L2UNIT with the new management information L2UNIT according to the capacity of the primary cache 18.

Thereby, the digest value DGST is calculated from the address of the data and is connected to the management information L2UNIT of the secondary cache 20. Thus, existence of the data of the secondary cache 20 can be directly calculated from the address of the transfer-target data.

Further, the digest value DGST is a hash value of the address of the data, and the management information cache control unit 36 includes: a bank managing function 36c which controls caching of the management information L2UNIT to the primary cache 18 in a unit of bank by defining a plurality of pairs of the plurality of pieces of the above-described data L2DATA and the management information L2UNIT as a bank; and a hash value managing function 36d which defines the corresponding relation between the banks and the hash values for each bank by using the bank numbers of the banks when there is contention between the hash values.

Thereby, even when the capacity of the secondary cache 20 is increased, it is possible to judge hit/mishit of the secondary cache 20 from the address of the data through avoiding contention of the pointers to the management information L2UNIT with the combination of the hash value and the bank number.

Further, the management information L2UNIT includes pages L2PAGE corresponding to a plurality of the data sectors 22, respectively. The L2PAGE includes a logic disk number LDN as well as a logic sector number LSN to be the address of the data, and a generation GEN that is referred to in exchange controls of the cache target, and it is structured to have no attribute range information which specifies "dirty" or "clean". Thus, the number of accesses to the management information L2UNIT is decreased since it does not have the attribute range information.

Further, the above-described secondary cache 20 includes a sector group of a plurality of ways for each of the banks. The management information cache control unit 36 includes a plural-way control function 36e which executes set associative controls directed to the sector group of the plurality of ways.

Thereby, the set associative control directed to a plurality of ways is executed. Further, it is possible to decrease the probability of causing slashing (frequent occurrence of replacement of page L2PAGE).

This will be described in details hereinafter.

(Primary Cache 18 and Management Information L2UNIT)

A cache control device 101 according to the first exemplary embodiment provides high-performance I/O to the host device 50 with the use of the primary cache 18 achieved by a high-speed memory 12 and the use of the secondary cache 20 achieved by a large-capacity storage medium 14 that is slower than the memory 12.

As shown in FIG. 1, the cache control device 101 is connected to the disk array device 10. The disk-array device (or a single-disk device 10) stores the data in a user volume 26. The data is the target of the cache control.

As described above, the cache control device 101 includes: the memory 12; the storage medium 14; the controller 16; the primary cache 18; and the secondary cache 20.

The memory 12 includes the primary cache 18 of the disk-array device 10 that stores the data.

This memory 12 is a semiconductor memory 12 such as RAM.

The storage medium 14 includes the secondary cache 20 for the primary cache 18. Further, it has a larger capacity than the memory 12 but is slower than the memory 12. An example of such storage medium 14 may be SSD.

The controller 16 controls transfer of the data using the primary cache 18 and the secondary cache 20.

The secondary cache 20 includes: the data sector 22 which stores the data by having a sector of a preset capacity as a unit; and a management information sector 24 which stores the management information L2UNIT including the addresses of a plurality of data sectors 22.

Further, the primary cache 18 connects and stores the digest values DGST calculated from the addresses of the data and the management information L2UNIT including the addresses of the data sectors 22 in the secondary cache 20 to which the data is cached.

Further, in the first exemplary embodiment, the controller 16 includes: the digest value calculation unit 30, the management information searching unit 32, and the readout control unit 34.

Among those, the digest value calculation unit 30 calculates the digest values DGST of the data when reading out the data. The digest value DGST is a digest of the address of the data. In this example, even when the address cannot be restored from the digest, it is simply required to be able to calculate different digests for the addresses of different data.

Thus, the digest value DGST may be defined as a value acquired by calculating an address with a unidirectional function. For example, a hash value can be used.

The address of the data may be a number such as the logic disk number LDN and the logic sector number LSN of the user volume 26, for example.

The management information searching unit 32 searches the management information L2UNIT in the primary cache 18 from the digest values DGST. The address of the data L2DATA stored in the secondary cache 20 in the user volume 26 is recorded in the management information L2UNIT, and the management information L2UNIT is stored in the primary cache 18. Thus, the management information searching unit 32 can make an access to the management information L2UNIT of the secondary cache 20 at a high speed without making an access to the secondary cache 20.

The readout control unit 34 reads out the data L2DATA by specifying the data sector 22 of the secondary cache 20 from the management information L2UNIT. When the management information L2UNIT is stored in the primary cache 18, the readout control unit 34 refers to the management information L2UNIT and reads out the data L2DATA from the secondary cache 20. When the management information L2UNIT is not stored in the primary cache 18, the readout control unit 34 reads out the management information L2UNIT from the secondary cache 20 and reads out the data L2DATA from the secondary cache 20 by referring to the management information L2UNIT.

When the management information L2UNIT is not stored in the primary cache 18 and the secondary cache 20, the readout control unit 34 reads out the data from the user volume 26.

The first exemplary embodiment manages the data of the secondary cache 20 with the simple information only containing the digest value DGST and the management information L2UNIT, so that it is possible to prevent the increase of the management information L2UNIT even when the capacity of the secondary cache 20 is increased. Further, through recording the management information L2UNIT of the secondary cache 20 to the primary cache 18, the management information L2UNIT can be searched at a high speed in the primary cache 18 even when the secondary cache 20 has a large capacity.

By employing such structure, the cache control device 101 according to the first exemplary embodiment can increase the speed of the accesses to the management information L2UNIT while preventing the increase of the management information L2UNIT. Therefore, the performance of the cache according to the capacity can be secured even when the capacity of the secondary cache 20 is increases to a large capacity. This also applies to the cache control method and the cache control program.

This will be described in details hereinafter.

(Cache Control Management Information L2UNIT)

In the first exemplary embodiment, preferably, the above-described controller 16 includes the management information cache control unit 36. The management information cache control unit 36 caches the management information L2UNIT of the secondary cache 20 to the primary cache 18 as the target of the cache control.

As the target of the cache control, not the entire management information L2UNIT of the secondary cache 20 but the management information L2UNIT regarding the data according to the passage of the accesses from the host device 50 is stored in the primary cache 18.

Thereby, it is possible to make the management information L2UNIT on the memory 12 to be of a small capacity even when the secondary cache 20 comes to have a large capacity, to increase the probability of making an access to the management information L2UNIT at a high speed and, at the same time, to reduce the frequency of the accesses made to the secondary cache 20.

Figure 2:
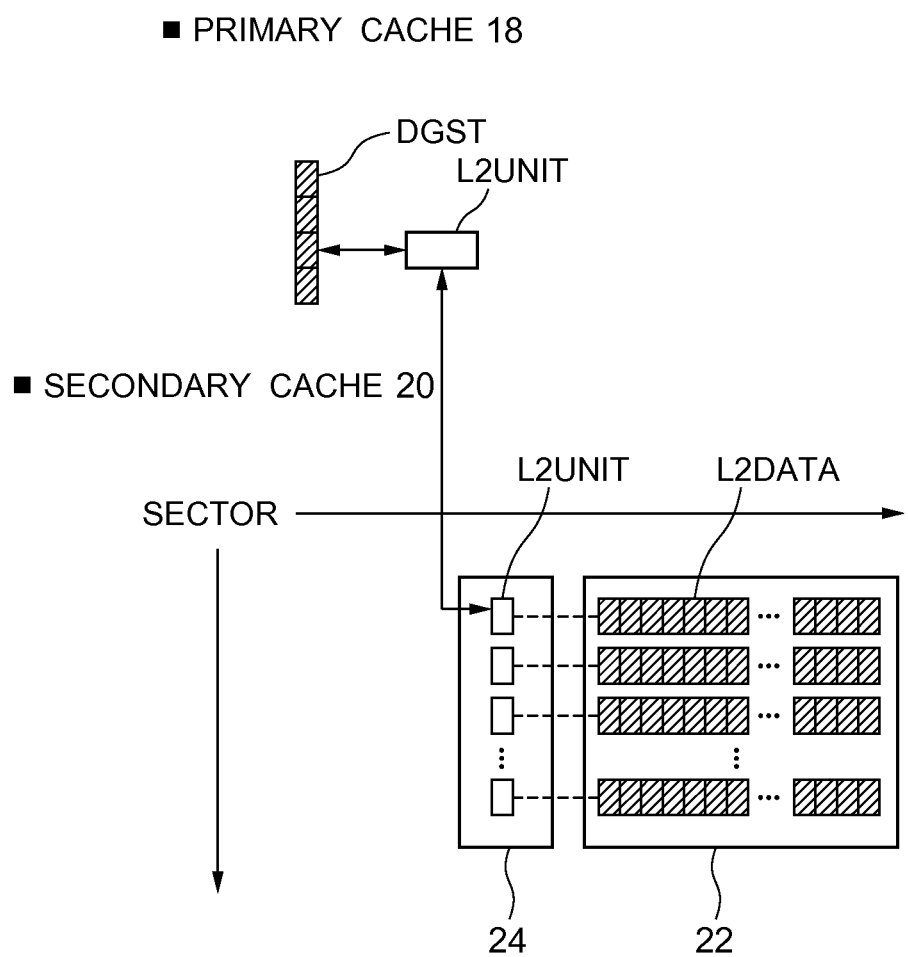
FIG. 2 is an explanatory chart showing an example of the relation between digest values and management information.

Further, as shown in FIG. 2, the primary cache 18 of the memory 12 has a region for caching a part of the management information L2UNIT within the entire management information L2UNIT of the secondary cache 20. That is, the primary cache 18 stores a part of the management information L2UNIT. Further, the digest value DGST (e.g., Hash list information) for searching the management information L2UNIT from the address of the data is prepared in the memory 12.

Furthermore, the management information L2UNIT and the data L2DATA are mapped on the storage medium 14 such as SSD, and it is defined as the secondary cache 20. The data in the secondary cache 20 is managed in a unit of sector. The secondary cache 20 includes the data sector 22 which stores the data, and the management information sector 24 which stores the management information L2UNIT.

The digest value calculating unit 30 calculates the digest values DGST from the addresses of the data, and specifies one digest value DGST. The specified digest value DGST is connected to the management information L2UNIT. Through specifying the management information L2UNIT, it is possible to make an access to the data L2DATA of the secondary cache 20 from the address.

As described, through calculating the digest value DGST from the address of the data and connecting it to the management information L2UNIT of the secondary cache 20, existence of the data in the secondary cache 20 can be judged from the address of the transfer-target data.

Figure 3:
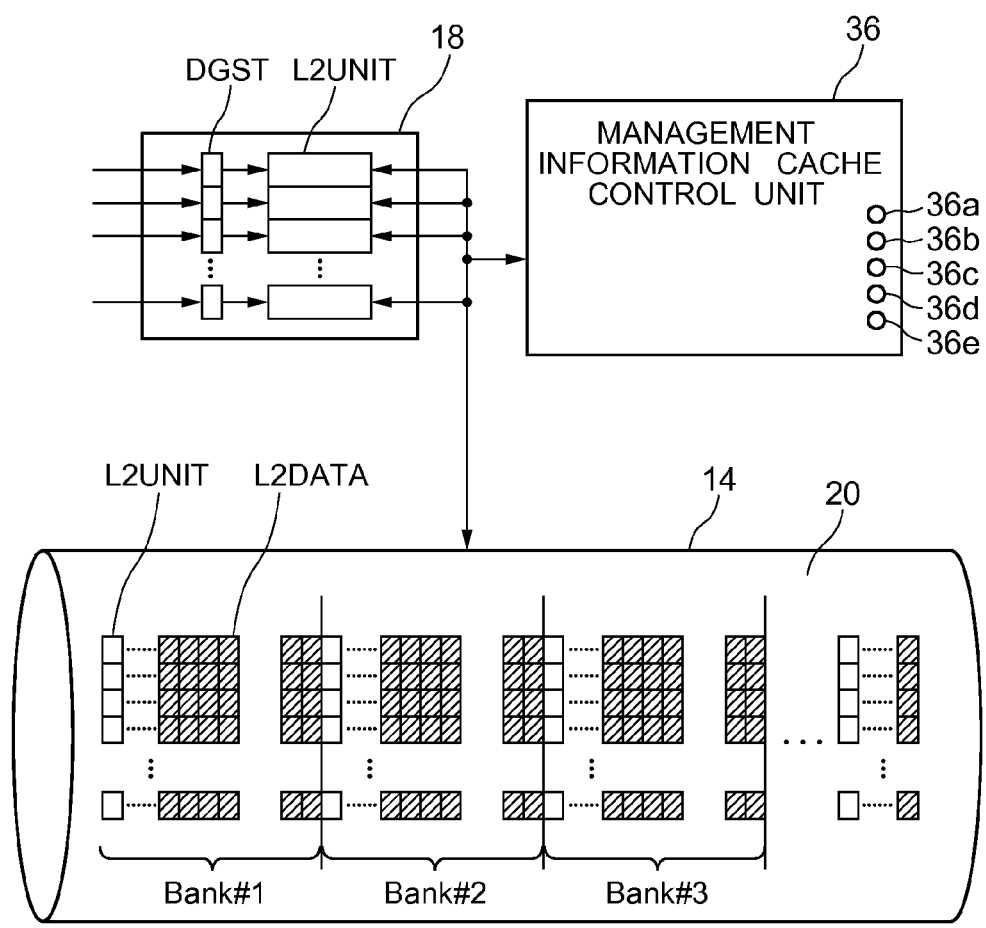
FIG. 3 is an explanatory chart showing an example of information processing for caching management information to a primary cache.

In an example shown in FIG. 3, the management information L2UNIT itself is taken as the target of the cache control, and the management information L2UNIT is cache-controlled to the primary cache 18. That is, there is a high possibility that a part of the data among the data stored in the secondary cache 20 is read out due to the locality of the data access. Therefore, the management information cache control unit 36 performs control to cache the management information L2UNIT of the data having a high possibility of that to the primary cache 18.

In this example, the management information cache control unit 36 includes the storage control function 36a and the exchange control function 36b.

When reading out the data, the storage control function 36a reads out the management information L2UNIT from the secondary cache 20, connects the management information L2UNIT to the digest value DGST, and stores it to the primary cache 18 when the management information L2UNIT is not cached to the primary cache 18. Thereby, when an access is made to the same data thereinafter, the management information searching unit 32 can search the management information L2UNIT in the primary cache 18 and transfer the data stored in the secondary cache 20 at a high speed.

Further, the exchange control function 36b exchanges the old management information L2UNIT with the new management information L2UNIT according to the capacity of the primary cache 18 (exchange processing). The exchange control function 36b may execute the exchange processing regularly or may execute the exchange processing at a point where a vacant region cannot be found when the storage control function 36a tries to store the management information L2UNIT in the primary cache 18. The "old" and "new" of the management information L2UNIT can be managed according to the information such as the generations of the management information L2UNIT, the final access time, and the like.

The management information cache control unit 36 includes the storage control function 36a and the exchange control function 36b, caches the management information L2UNIT of the secondary cache 20 to the primary cache 18, and performs the control for exchanging the management information L2UNIT according to the "old" and "new" of the management information L2UNIT. Thus, regarding the cache control, the accesses made to the secondary cache 20 having a large capacity can be managed with about the same processing time as that of the accesses made to the primary cache 18.

Figure 4:
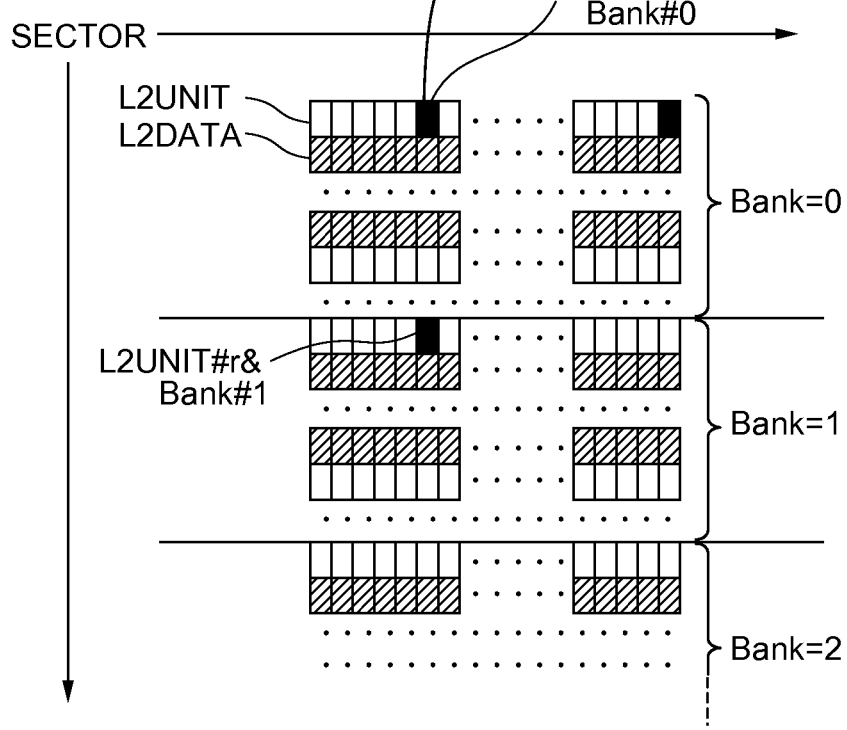
FIG. 4 is an explanatory chart showing an example of information processing for specifying the data of the secondary cache with a management number and a bank number.

With the first exemplary embodiment, further, as shown in FIG. 3 and FIG. 4, it is possible to use the secondary cache 20 having a still larger capacity can be used with a high performance through using the bank and the hash value. In this example, the hash value is used as the digest value DGST. The management information cache control unit 36 includes the bank managing function 36c and the hash value managing function 36d. The hash value is the hash value acquired from the address of the data.

The bank managing function 36c controls the caching of the management information L2UNIT to the primary cache 18 in a unit of bank by having a plurality of pairs of a plurality of pieces of data L2DATA and management information L2UNIT as a bank (FIG. 3, FIG. 4). For example, the generation GEN of the management information L2UNIT is managed by the unit of bank, and the exchange processing of the management information L2UNIT is executed by the unit of bank. Through performing the cache control by the unit of bank, the storage positions of the data can be dispersed. As a result, the number of erasures done in the storage medium 14 such as SSD can be decreased.

Further, the hash value managing function 36d associates the hash values to each bank by using the bank number of the bank when there is contention between the hash values. This makes it possible to overcome the contention generated between the hash values.

As shown in FIG. 4, in the first exemplary embodiment, the data in the secondary cache 20 is specified with the management number and the bank number in a following manner.

(1) The hash number is calculated from LDN/LSN numbers, and the bank number having the corresponding LDN/LSN numbers is specified from the bank connected to that hash value.

(2) The management information L2UNIT#r on the primary cache 18 of the memory 12 linked to the hash value is searched, and it is checked to see whether or not the data corresponding to the LDN/LSN numbers is linked. Here, the management number L2UNIT#r and BANK#0 are specified.

(3) When judged as linked, the information is used. When judged as unlinked, the information of loading target is read.

As described, with the combination of the hash value and the bank number, it is possible to avoid the contention of the pointer to the management information L2UNIT. Further, this makes it possible to judge hit/mishit of the secondary cache 20 from the address of the data even when the capacity of the secondary cache 20 is increased.

FIG. 5 shows an example of the data structure of the management information L2UNIT suited for managing the secondary cache 20 of a large capacity with a small amount of management information L2UNIT. The management information L2UNIT (e.g., 512 byte) has a plurality of L2PAGEs. The page L2PAGE is defined as the information carrying following information used for management in which the data sectors 22 of a plurality of pieces of data L2DATA are put together. The management information L2UNIT is defined as an aggregate of those pages from L2PAGE0 to 31 (32 in total).

Logic disk (LDN): Logic disk number LDN of user volume 26
State (state): State value (Null/Dirty/Clean)
Generation (GEN): Generation information for LRU control
Reservation (Rsv): Reserved
Logic sector (LSN): Logic sector number LSN of user volume 26 (head address of data)

For example, when 2,048 sectors of the data L2DATA are managed in 1 sector of the management information L2UNIT, the page L2PAGE is handled as information of 64 sectors.

Depending on the embodiments, the state of individual pages L2PAGE is not used but the state of dirty/clean and the like is managed by the management information L2UNIT or the unit of bank. With the structure where there is no such state (attribute range information) in the unit of individual page L2PAGE, the number of accesses to the management information L2UNIT can be decreased.

As described, the management information L2UNIT has the pages L2PAGE corresponding to a plurality of data sectors 22, respectively. The page L2PAGE has the logic disk number LDN and the logic sector number LSN to be the address of the data as well as the generation GEN that is referred to at the time of controlling the exchange of the cache target. In the preferred embodiment, the state (attribution range information) is not included in the data item.

As shown in FIG. 6, the secondary cache 20 can be set as the 4-way set associative type. In this example, the secondary cache 20 has a plural-way sector group for each bank. Further, a plural-way control function 36e of the management information cache control unit 36 performs set associative control targeted at the plural-way sector group. In the set associative control of this exemplary embodiment, dispersion described in the following may be performed in order to avoid the contention of the hash values.

First Dispersion Example

Since the hash calculation is done from LDN/LSN of the user volume 26, the hash values of different addresses become the same hash number depending on the combination of LDN/LSN. The data group having the same hash number corresponds to the cash line of a general processor. In the first exemplary embodiment, the hash contention state is avoided by further adding the BANK number when the hash values come to have the same hash number to locate them in a dispersed manner (n-way) within the secondary cache 20.

Second Dispersion Example

When there still is a case of having the same Hash/BANK/SubBANK numbers, the L2UNIT where the data of the LDN/LSN can be placed may be allocated to a plurality of sections (n-way).

As shown in FIG. 6, in each of the banks in the primary cache 18, the corresponding positions may be changed with LRU control within 4-ways. For example, in the example shown in FIG. 6, only the management information L2UNIT of way=2 (way#2) regarding the management information L2UNIT#s is stored in the primary cache 18.

If BANK/SubBANK is 0, the logic sector number LSN becomes 0. The position of the corresponding management information L2UNIT#s is the fifth sector when an offset conversion is done in a page. Further, the cache section of the management information L2UNIT within the primary cache 18 is managed with four sectors at all times.

As described, through having a relatively large capacity of "bank" as a unit and performing set associative control targeted at a plurality of ways, the probability of generating slashing (replacement of page L2PAGE, management information L2UNIT) can be decreased.

(Data Readout Action)

Next, an example of data readout (fetching) done by the cache control device 101 according to the first exemplary embodiment will be described by referring to a flowchart shown in FIG. 7. Note here that each of the action steps is executed by the controller 16 described above.

That is, first, the summary calculation unit 30 of the controller 16 calculates the digest value DGST of the data when reading out the data.

Then, the management information searching unit 32 searches the management information L2UNIT in the primary cache 18 based on the digest value DGST.

Further, the readout control unit 34 reads out the data L2DATA as the searched result by specifying the data sector 22 of the secondary cache 20 based on the management information L2UNIT.

Hereinafter, this will be described in more details.

First, the management information L2UNIT and the data L2DATA are located in the storage medium 14 such as SSD. Then, I/O for a given address (LDN/LSN) is issued from the host device 50 (host), and processing shown in FIG. 7 is executed when there is no hit in the primary cache 18.

Figure 7:
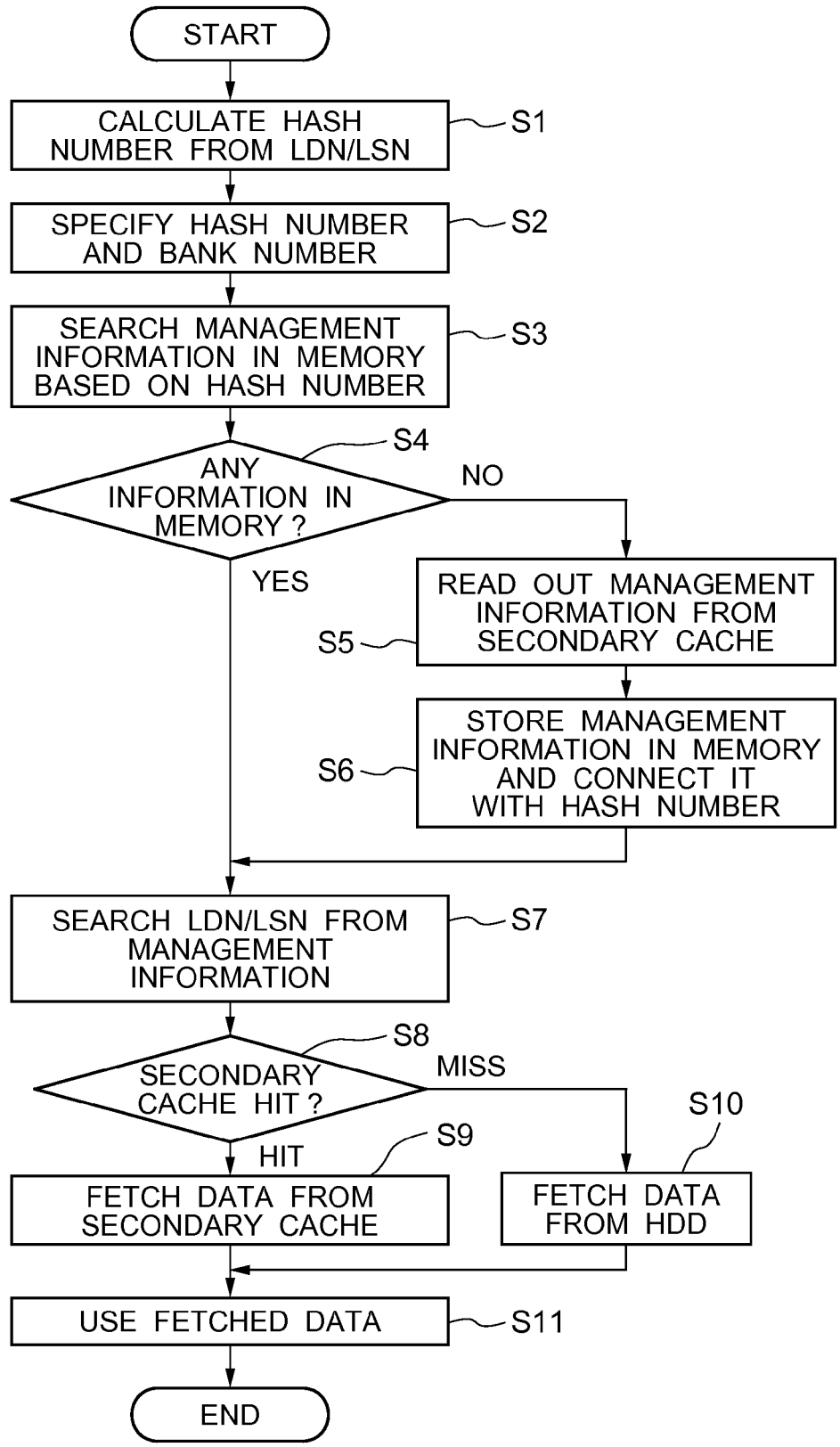
FIG. 7 is a flowchart showing an example of data cutout processing in the first exemplary embodiment.

First, a hash calculation is executed from the address (LDN/LSN) (FIG. 7: step S1), and the Hash number and the BANK number are specified (FIG. 7: step S2). Then, the management information L2UNIT linked to the Hash number is searched on the memory 12 (FIG. 7: step S3), and it is checked whether or not the management information L2UNIT is cached on the memory 12 (FIG. 7: step S4).

When judged in step S4 that it is not cached, the procedure is advanced to step S5 of FIG. 7. When judged that it is cached, the processing of step S7 shown in FIG. 7 is executed.

Then, the management information L2UNIT is read out from the storage medium 14 that is the secondary cache 20 (FIG. 7: step S5), and it is stored on the memory 12 and connected to the Hash number (FIG. 7: step S6). Through connecting the management information L2UNIT and the Hash number, the management information L2UNIT can be specified from the address (LDN/LSN) on the memory 12.

Subsequently, the management information L2UNIT is checked (FIG. 7: step S7) to see whether or not there is the data corresponding to LDN/LSN (FIG. 7: step S8).

When judged in step S8 that there is the data, the processing is shifted to step S9 (hit in the secondary cache 20). When judged that there is no data, the processing is shifted to step S10 (mishit in the secondary cache 20).

Further, in step S9 (hit in the secondary cache 20), it is judged that there is the data in the secondary cache 20 and the information is fetched from the data L2DATA corresponding to the management information L2UNIT (FIG. 7: step S9). Then, the fetched data is used (FIG. 7: step S11).

In the meantime, in step S10 (mishit in the secondary cache 20), it is judged that there is no data in the secondary cache 20 and the information is fetched from the user volume 26 in the disk array device 10 (HDD) (FIG. 7: step S10). Then, the fetched data is used (FIG. 7: step S11).

As described, following effects can be achieved by the first exemplary embodiment.
(1) By using the storage medium 14 such as SSD as the secondary cache 20, it is possible to execute high-speed reading and writing from/to the storage medium 14 without reading out the information from HDD.
(2) Through caching a part of the management information L2UNIT on the memory 12, the accesses to the storage medium 14 can be reduced.
(3) There is flexibility in the capacity ratio between the management information L2UNIT and the data L2DATA, so that the capacity of the management information L2UNIT is not increased even with the secondary cache of a large capacity.
(4) Since the group of pairs of the management information L2UNIT and the data L2DATA is managed as BANK and dispersed, it is possible to decrease the probability of performing erasure (ERASE) in the storage medium 14 such as SDD, to extend the life thereof, and to make it homogeneous.

The present invention is structured and functions in the manner described above. As an exemplary advantage according to the invention, the digest value of the data is calculated when reading out the data, and the management information in the primary cache is searched based on the digest value. Thus, the data is read out by making an access to the existence and content of the management information of the data stored in the secondary cache without making an access to the secondary cache. This makes it possible to manage the data of the secondary cache with simple information carrying only the digest value and the management information. Therefore, the increase of the management information can be prevented even when the capacity of the secondary cache is increased. As a result, it is possible to provide the excellent cache control device, cache control method, and program thereof, which can improve the performance of the cache.

Second Exemplary Embodiment

Next, the second exemplary embodiment will be described by referring to FIG. 8 to FIG. 9.

Note here that same reference numerals are applied to the same structural members as those of the first exemplary embodiment described above.

Figure 8:
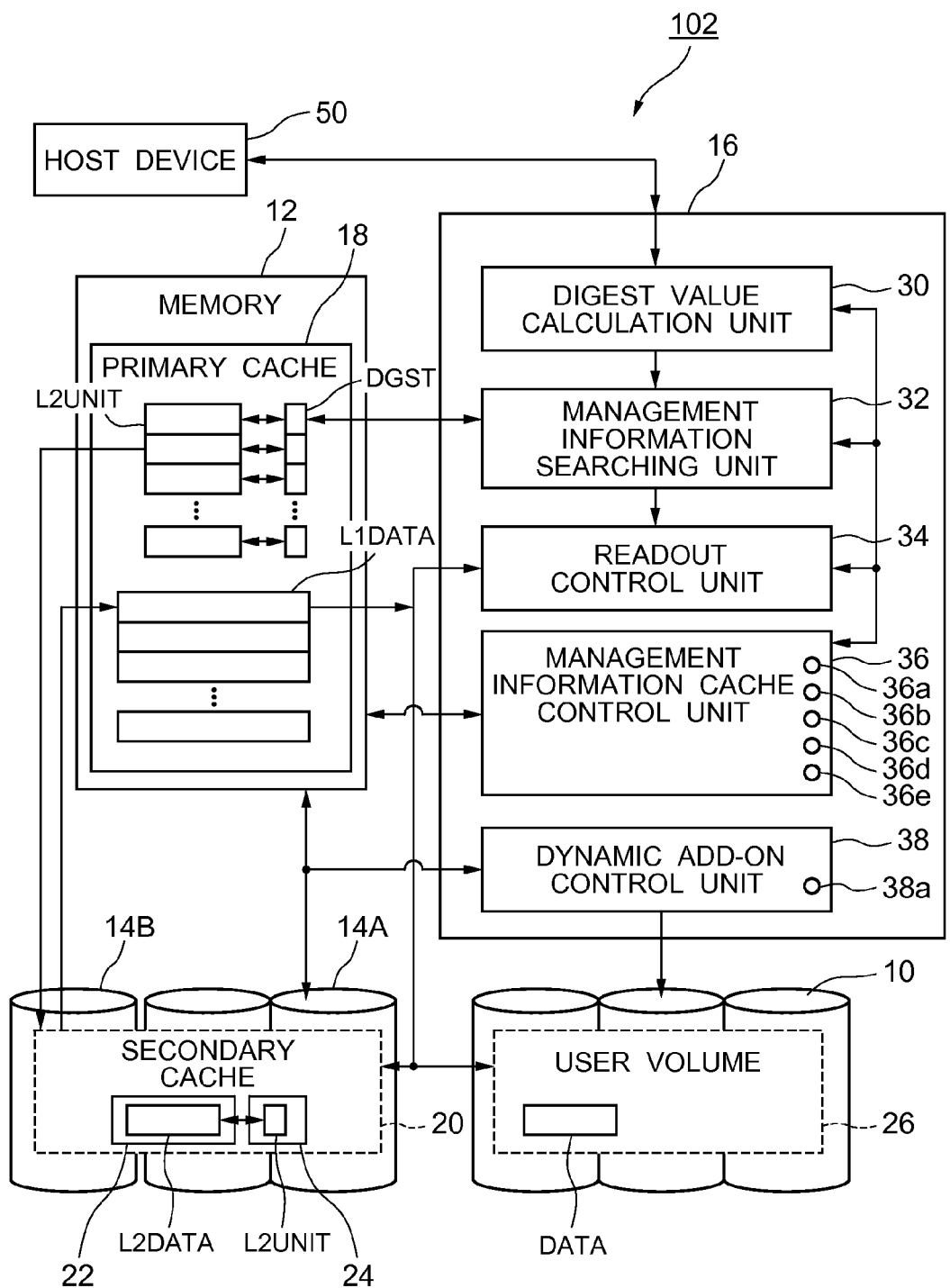
FIG. 8 is a block diagram showing an example of the structure of a second exemplary embodiment of the present invention.

As shown in FIG. 8, a cache control device 102 according to the second exemplary embodiment dynamically adds a new storage medium 14B while the secondary cache 20 is in action that is executed by the storage medium 14A.

For dealing with the dynamic add-on, the cache control device 102 is so structured that the controller 16 includes a dynamic add-on control unit 38 in addition to the structures of the first exemplary embodiment described above.

Other structures are the same as those of the first exemplary embodiment described above.

In that case, the newly provided dynamic add-on control unit 38 is provided with a function which selects the readout-target bank according to the fact whether the hash value is the old number of banks before adding the capacity, the shift period, or the new number of banks when the capacity of the secondary cache 20 is dynamically added by the unit of bank.

As described, by managing the hash value and the number of banks, it is possible to dynamically add on the capacity of the secondary cache 20.

In a preferred example, the dynamic add-on control unit 38 is preferable to include a shift control function 38a which controls the shift of the number of banks by controlling the management information L2UNIT until all the hash values are changed to the new number of banks. In this manner, the capacity of the secondary cache 20 can be dynamically expanded through controlling the management information L2UNIT.

Figure 9:
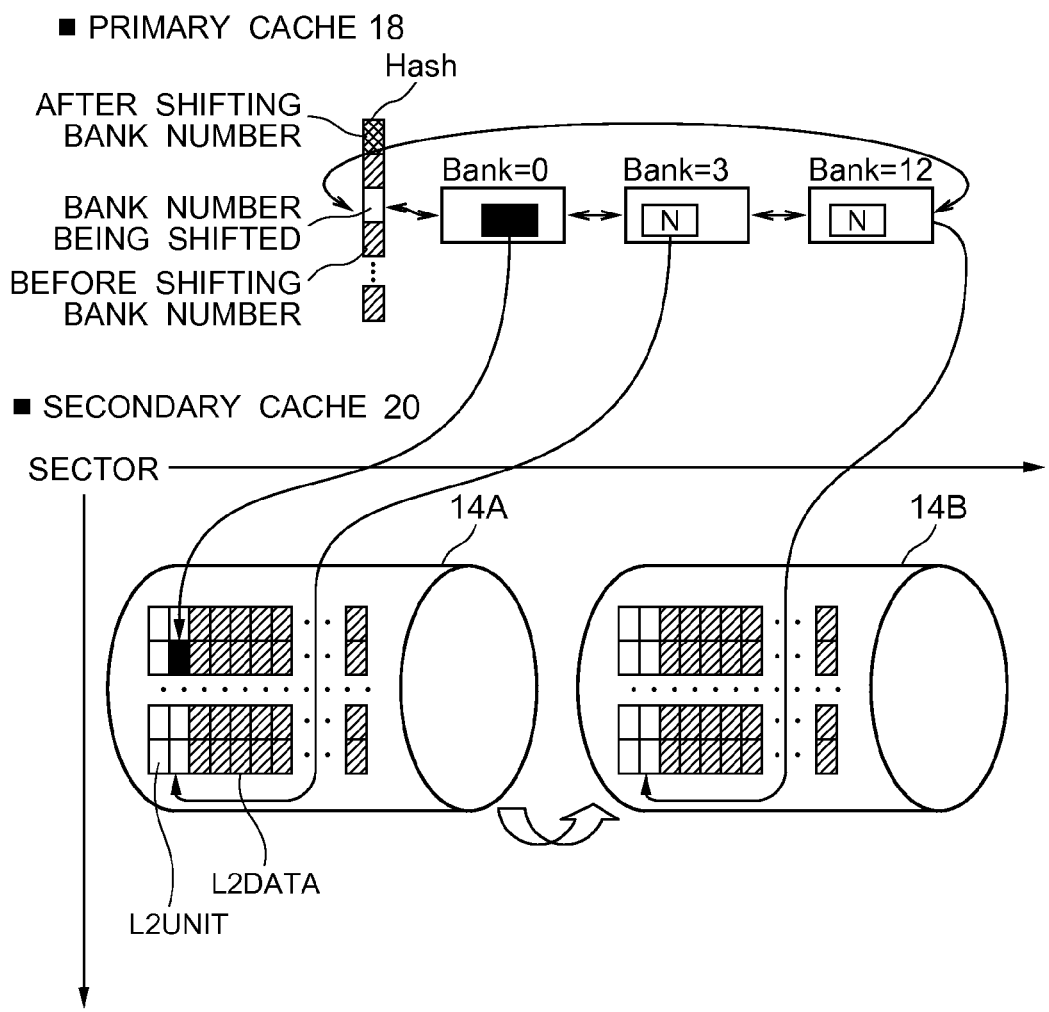
FIG. 9 is an explanatory chart showing an example where dynamic add-on is done on the secondary cache.

As shown in FIG. 9, the dynamic add-on control unit 38 specifies the Hash number from LDN/LSN, checks whether the hash state is "the old number of banks", "the shift state", or "the new number of banks", and changes the BANK position to read out the information. This add-on is done by a unit of hash. When the capacity of the secondary cache 20 is expanded by adding a disk, the number of banks is increased from M to N.

It is monitored whether or not the management information L2UNIT carrying effective information including hit/mishit is connected to the hash value, and it is waited until all the connected ones are changed to the new number of banks (the shift control function 38a).

As described above, the second exemplary embodiment provides following effects in addition to the operation effects of the first exemplary embodiment described above.
(1) The dynamic expansion of the capacity can be achieved through checking the generation by a unit of bank at the time of calculating the hash.

Advantages of First and Second Exemplary Embodiments

The advantages of the feature techniques of the exemplary embodiments and the combination thereof can be summarized as follows.

Feature 1): Use of the large-capacity storage medium 14 (e.g., SSD) that is cheaper than the memory 12 and higher in speed than HDD.

The large-capacity storage medium 14 (SSD, flash memory, or the like) which can be loaded to the disk array device 10 is used as an auxiliary cache (the secondary cache 20) for the disk cache.

Feature 2): Data layout not depending on the characteristic of the storage medium 14.

The data access unit is defined as a unit of sector (512 byte in general), and the data are disposed by classifying the sectors into the management information sector 24 (the management information L2UNIT) showing the content of the data and the sector (L2DATA) for storing the data itself within the storage medium 14 (FIG. 1, FIG. 3).

Feature 3): Data management taking the frequency of accesses made to the storage medium 14 into consideration.

The frequency of accesses made to the storage medium 14 is decreased by caching a part of the management information L2UNIT on the memory 12 loaded to the disk array device 10 and managing it with an LRU control (FIG. 4).

Though executing a cache control by having a plurality of pieces of management information L2UNIT as a single data unit, an n-way set associative control can be achieved (FIG. 6). Thereby, the probability of having slashing can be decreased and the access frequency can be decreased.

Feature 4): The management information L2UNIT taking the access efficiency and capacity efficiency into consideration.

The management information L2UNIT is defined as the information for managing a plurality of sectors of the data L2DATA.

The management information L2UNIT is an aggregation data of the pages L2PAGE, and the page L2PAGE is defined as the information from which the data range information and the attribute range information requiring update frequently for improving the data access frequency is omitted.

The capacity efficiency is improved by increasing the number of sectors of L2DATA managed by the L2UNIT sector.

The attribute range information is Dirty (unwritten to HDD)/Clean (written to HDD)/Null (unused).

Feature 5): Dynamic expansion of the storage medium 14 (add-on of the capacity, and the like).

A plurality of pairs of the management information L2UNIT and the data L2DATA are gathered and defined as a bank, and a plurality of those are disposed on the storage medium 14 (FIG. 3). Through adding the capacity by bank×n unit, the capacity of the secondary cache 20 can be expanded during operation (FIG. 9).

Through dispersing the information and the data as the bank, the number of erasure (ERASE) processing peculiar to the storage medium 14 can also be decreased as a result thereof.

Note here that the update frequency of the management information L2UNIT is decreased due to Feature 3) and Feature 4) described above, so that the access frequency made to the storage medium 14 can be improved.

The increase of the management information L2UNIT having a large-capacity structure is suppressed both on the memory 12 and the storage medium 14 due to Feature 4) described above.

Further, the secondary cache 20 having a large capacity can be achieved due to Feature 2) and Feature 5) described above.

Other Example

Figure 10:
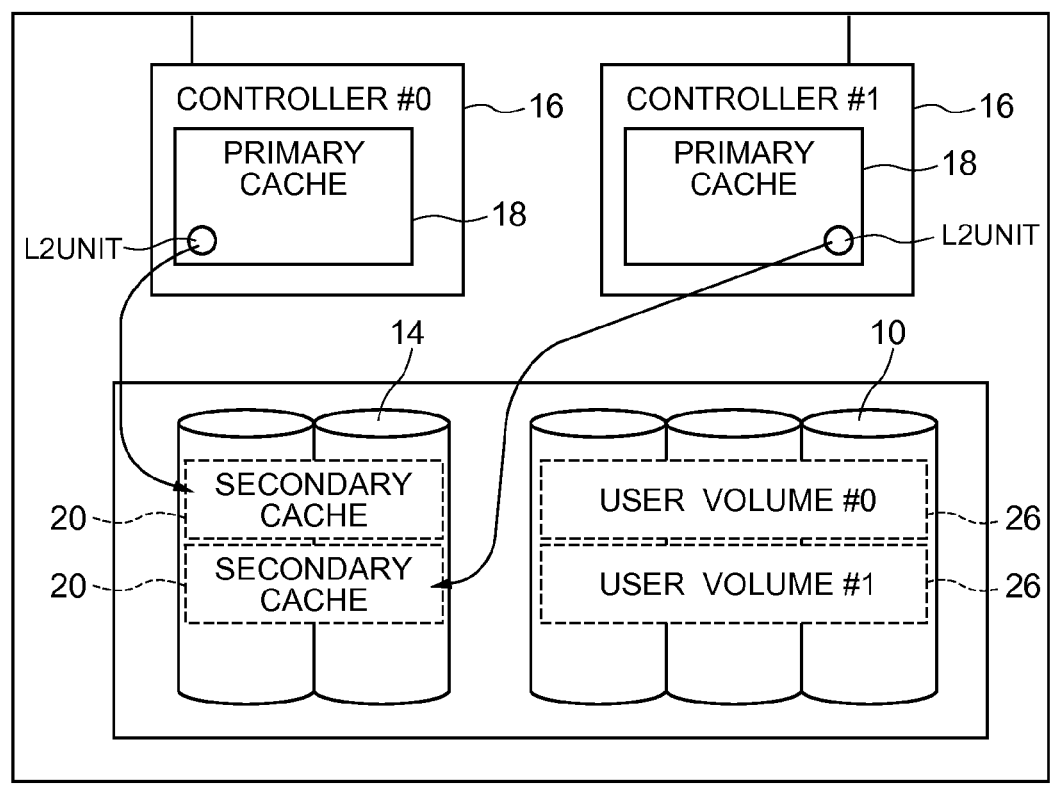
FIG. 10 is an explanatory chart showing another example where the disk and the cache are duplicated in the second exemplary embodiment.

Next, FIG. 10 shows an example where two-system cache control devices 101 and 102 are disposed for the disk array device 10. Further, the disk array device 10 shown in FIG. 10 is structured to have the primary cache 18 loaded on the memory 12 within the controller 16. A storage medium 14 (e.g., SSD) of a higher performance than HDD is added as the secondary cache 20. Information described in the embodiment is disposed in the above-described storage medium 14, and it is managed as the secondary cache 20.

Now, the actions in common to the cache control devices 101 and 102 according to the first and second exemplary embodiments will be described.

The cache control method of the first and second exemplary embodiment uses the cache control devices 101 and 102. As described above, the cache control device includes the memory 12 having the primary cache 18, the storage medium 14 having the secondary cache 20, and the controller 16. The secondary cache 20 includes the data sector 22 for storing the data, and the management information sector 24 for storing the management information L2UNIT. The primary cache 18 connects and stores the digest value DGST of the address and the management information L2UNIT.

Further, as shown in FIG. 7, with the cache control method, the summary calculation unit 30 of the controller 16 calculates the digest value DGST of the data when reading out the data (FIG. 7: step S1/a digest value DGST calculation procedure).

Further, the management information searching unit 32 searches the management information L2UNIT in the primary cache 18 based on the digest value DGST, and gives it to the readout control unit 34 (FIG. 7: step S7/a management information L2UNIT searching procedure). Furthermore, the readout control unit 34 specifies the data sector 22 of the secondary cache 20 from the management information L2UNIT, and reads out the data L2DATA (FIG. 7: step S9/a readout control procedure).

Note here that the operation content (particularly each of the operation steps shown in FIG. 7) executed in the operating sections of each of the above-described structures may be put into a program that can be executed by a computer, and have each of the above-described steps (procedures) executed by the controller 16.

In that case, each of the programs may be recorded on a nonvolatile recording medium such as a hard disk, DVD, CD, or a flash memory. In that case, the program is read out from the recording medium by the computer and executed.

Further, other than execution of the program, it is possible to be achieved by integration of the logic circuits.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The points of the new technical contents of each of the exemplary embodiments described above are follows. A part of or a whole part of the exemplary embodiments can be summarized as follows as the new techniques. It is to be noted, however, that the present invention is not limited only to those.

(Supplementary Note 1: FIG. 1)

A cache control device which includes: a memory 12 including a primary cache 18 of a disk unit 10 that stores data; a storage medium 14 including a secondary cache 20 for the primary cache 18, which is of a larger capacity and a lower speed than the memory 12; and a controller 16 for controlling transfer of the data using the primary cache 18 and the secondary cache 20, wherein:

the secondary cache 20 includes a data sector 22 which stores the data by having a sector of a predetermined capacity as a unit, and a management information sector 24 which stores management information L2UNIT containing addresses of a plurality of the data sectors 22;

the primary cache 18 connects and stores a digest value DGST (Hash information) calculated from the address of the data and the management information L2UNIT containing the address of the data sector 22 in the secondary cache 20 to which the data is cached; and the controller 16 includes a digest value calculation unit 30 which calculates the digest value DGST of the data when reading out the data, a management information searching unit 32 which searches the management information L2UNIT in the primary cache 18 based on the digest value DGST, and a readout control unit 34 which specifies the data sector 22 in the secondary cache 20 based on the management information L2UNIT and reads out the data L2DATA.

With Supplementary Note 1, the management information L2UNIT of the secondary cache 20 is recorded to the primary cache 18. Thus, the management information L2UNIT can be searched in the primary cache 18 at a high speed even when the secondary cache 20 has a large capacity. Therefore, the secondary cache 20 having a large capacity can be managed at a high speed.

(Supplementary Note 2: FIG. 1)

The cache control device as depicted in Supplementary Note 1, wherein the controller 16 includes a management information cache control unit 36 which caches the management information L2UNIT in the secondary cache 20 to the primary cache 18 as a target of cache control. Thereby, the frequency of the accesses made to the secondary cache 20 can be decreased.

(Supplementary Note 3: FIG. 1, FIG. 2, FIG. 3)

The cache control device as depicted in Supplementary Note 2, wherein the management information cache control unit 36 includes:
- a storage control function 36a which reads out the management information L2UNIT from the secondary cache 20, connects the management information to the digest value DGST and stores them to the primary cache 18, when the management information L2UNIT is not cached to the primary cache 18 when reading out the data; and
- an exchange control function 36b which exchanges the old management information L2UNIT with new management information L2UNIT according to the capacity of the primary cache 18.

With Supplementary Note 3, the digest value DGST is calculated from the address of the data and connected to the management information L2UNIT of the secondary cache 20. Thus, existence of the data in the secondary cache 20 can be calculated directly from the address of the transfer-target data.

(Supplementary Note 4: FIG. 1, FIG. 4)

The cache control device as depicted in Supplementary Note 3, wherein:
- the digest value DGST is a hash value of the address of the data; and
- the manage information cache control unit 36 includes a bank managing function 36c which controls caching of the management information L2UNIT to the primary cache 18 by a unit of bank by having a plurality of pairs of the plurality of pieces of the data and the management information L2UNIT as a single bank, and a hash-value managing function 36d which associates the hash value with each of the banks by using bank numbers of the banks when there is contention between the hash values.

With Supplementary Note 4, it is possible to judge whether it is hit or mishit of the secondary cache 20 from the address of the data even when the secondary cache 20 is increased to have a large capacity, through avoiding contention of the pointers to the management information by using the combination of the hash value and the bank number.

(Supplementary Note 5: FIG. 1, FIG. 5)

The cache control device as depicted in Supplementary Note 1, 2, 3, or 4, wherein:
- the management information L2UNIT includes pages L2PAGE corresponding to a plurality of the data sectors 22, respectively; and
- the page L2PAGE has a logic disk number LDN as well as a logic sector number LSN to be the address of the data and has a generation GEN referred for an exchange control of the cache target, but does not have attribute range information for specifying "dirty" or "clean".

With Supplementary Note 5, the number of accesses to the management information L2UNIT is decreased by having no attribute range information.

(Supplementary Note 6: FIG. 1, FIG. 6)

The cache control device as depicted in Supplementary Note 4 or 5, wherein:
- the secondary cache 20 includes a plural-way sector group for each of the banks; and
- the management information cache control unit 36 includes a plural-way control function 36e which performs a set associative control targeted at the plural-way sector group. With Supplementary Note 6, the set associative control targeted at the plurality of ways is executed. This makes it possible to decrease the probability of generating slashing (frequent replacement of pages L2PAGE).

(Supplementary Note 7: FIG. 1, FIG. 8)

The cache control device as depicted in Supplementary Note 3, 4, 5, or 6, wherein:
- the controller 16 includes a dynamic add-on control function 38 which, when the capacity of the secondary cache 20 is dynamically added by the unit of bank, selects the bank as a readout-target according to a state of the hash value whether it is the old number of banks before adding the capacity, a shift state, or a new number of banks.

With Supplementary Note 7, the secondary cache 20 can be added on dynamically by managing the hash value and the number of banks.

(Supplementary Note 8: FIG. 8)

The cache control device as depicted in Supplementary Note 7, wherein the dynamic add-on control unit 38 includes a shift control function 38a which controls shift of the number of banks by performing the cache control of the management information L2UNIT until all the hash values are changed to the new number of banks.

With Supplementary Note 8, it is possible to dynamically add on the secondary cache 20 by executing the cache control on the management information L2UNIT.

(Supplementary Note 9: FIG. 1, FIG. 7)

A cache control method which controls caching by using a cache control device including a memory 12 including a primary cache 18 of a disk unit 10 that stores data; a storage medium 14 including a secondary cache 20 for the primary cache 18, which is of a larger capacity and a lower speed than the memory 12, and a controller 16 for controlling transfer of the data using the primary cache 18 and the secondary cache 20, the secondary cache 20 including a data sector 22 which stores the data by having a sector of a predetermined capacity as a unit, and a management information sector 24 which stores management information L2UNIT containing addresses of a plurality of the data sectors 22, and the primary cache 18 connecting and storing a digest value DGST calculated from the address of the data and the management information L2UNIT containing the address of the data sector 22 in the secondary cache 20 to which the data is cached; wherein:
- a digest value calculation unit 30 of the controller 16 calculates the digest value DGST of the data when reading out the data;
- a management information searching unit 32 searches the management information L2UNIT in the primary cache 18 based on the calculated digest value DGST and gives it to a readout control unit 34; and the readout control unit 34 specifies the data sector 22 in the secondary cache 20 based on the management information and reads out the data.

(Supplementary Note 10: FIG. 1, FIG. 7)

A cache control program used in a cache control device including a memory 12 including a primary cache 18 of a disk unit 10 that stores data; a storage medium 14 including a secondary cache 20 for the primary cache 18, which is of a larger capacity and a lower speed than the memory 12, and a controller 16 for controlling transfer of the data using the primary cache 18 and the secondary cache 20, the secondary cache 20 including a data sector 22 which stores the data by having a sector of a predetermined capacity as a unit, and a management information sector 24 which stores management information L2UNIT containing addresses of a plurality of the data sectors 22, and the primary cache 18 connecting and storing a digest value DGST calculated from the address of the data and the management information L2UNIT containing the address of the data sector 22 in the secondary cache 20 to which the data is cached. The program causes the controller 16 to execute:

a digest value calculation procedure (corresponds to reference numeral 30) which calculates the digest value DGST of the data when reading out the data;

a management information searching procedure (corresponds to reference numeral 32) which searches the management information L2UNIT in the primary cache 18 based on the calculated digest value; and a readout control procedure (corresponds to reference numeral 34) which specifies the data sector 22 in the secondary cache based on the management information and reads out the data.

(Supplementary Note 11: FIG. 1, FIG. 3)

The cache control program as depicted in Supplementary Note 10, which further causes the controller 16 to execute a management information cache control procedure (corresponds to reference numeral 36) which caches the management information L2UNIT of the secondary cache 20 to the primary cache 18 as the target of cache control.

(Supplementary Note 12: FIG. 8, FIG. 9)

The cache control program as depicted in Supplementary Note 11, which further causes the controller 16 to execute: a bank managing procedure (corresponds to reference numeral 36c) which controls caching of the management information L2UNIT to the primary cache 18 by a unit of bank by having a plurality of pairs of the plurality of pieces of the data and the management information L2UNIT as a single bank;

a hash-value managing procedure (corresponds to reference numeral 36d) which associates the hash value with each of the banks by using bank numbers of the banks when there is contention between the hash values; and a dynamic add-on control procedure (corresponds to reference numeral 38) which selects the bank as the target of readout according to a state of the hash value whether it is the old number of banks before adding the capacity, a shift state, or a new number of banks when the capacity of the secondary cache is dynamically added by the unit of bank.

INDUSTRIAL APPLICABILITY

The present invention can be employed for all the external memory devices using a cache.

In particular, the present invention remarkably exhibits the effects thereof in a case of the disk device and the disk array device 10.

What is claimed is:

1. A cache control device comprising:
a primary cache to cache first data and second data;
a secondary cache for the primary cache to cache the first data at a first address of the secondary cache within a first bank of the secondary cache and the second data at a second address of the secondary cache within a second bank of the secondary cache; and
a controller to:
calculate a first digest value for the first data from the first address of the secondary cache and a second digest value for the second data from the second address of the secondary cache;
store the first digest value, the second digest value, the first address, and the second address within the primary cache; and
associate the first digest value with the first bank and the second digest value with the second bank so as to avoid contention between the first digest value and the second digest value.

2. The cache control device of claim 1, further comprising a memory including the primary cache.

3. The cache control device of claim 1, wherein the primary cache is for a disk storage unit.

4. The cache control device of claim 1, wherein the secondary cache has a larger capacity than the primary cache and has a slower access speed than the primary cache.

5. The cache control device of claim 1, wherein the controller is to control transfer of data using the primary cache and the secondary cache by:
calculating the digest value of the data;
searching the primary cache for an address of the secondary cache at which the data is stored from the digest value of the data; and
when there is contention between the digest value of the data and a digest value of different data, using an association of the digest value of the data with a bank of the secondary cache to resolve the contention.

6. The cache control device of claim 5, wherein the controller is to control the transfer of the data using the primary cache and the secondary cache by further:
reading the data from the secondary cache at the address at which the data is stored.

7. The cache control device of claim 1, wherein the first digest value is a first hash value of the first address determined using a hash function, and the second digest value is a second hash value of the second address determined using the hash function.

8. The cache control device of claim 1, wherein the secondary cache comprises:
a first data sector having the first address at which the first data is cached;
a second data sector having the second address at which the second data is cache;
a first management sector storing the first address; and
a second management sector storing the second address.

9. The cache control device of claim 1, wherein the controller is further to:
increase a capacity of the secondary cache by adding a new bank to the secondary cache.

10. The cache control device of claim 9, wherein the controller is further to:
after adding the new bank to the secondary cache, updating the first digest and the second digest.

11. A method comprising:
calculating, by a controller, a first digest value for first data from a first address of a secondary cache, the secondary cache for a primary cache that is to cache the first data, the secondary cache to cache the first data at the first address within a first bank of the secondary cache;

calculating, by the controller, a second digest value for second data from a second address of the secondary cache, the primary cache to cache the second data, the secondary cache to cache the second data at the second address within a second bank of the secondary address;

storing, by the controller, the first digest value, the second digest value, the first address, and the second address within the primary cache;

associating the first digest value with the first bank and the second digest value with the second bank so as to avoid contention between the first digest value and the second digest value; and controlling transfer of data between the primary cache and the secondary cache using a digest value and a digest value-bank association for the data.

12. The method of claim 11, wherein controlling the transfer of the data comprises:

calculating the digest value of the data;

searching the primary cache for an address of the secondary cache at which the data is stored from the digest value of the data; and when there is contention between the digest value of the data and a digest value of different data, using the digest value-bank association for the data to resolve the contention.

13. The method of claim 12, wherein controlling the transfer of the data further comprises:

reading the data from the secondary cache at the address at which the data is stored.

14. The method of claim 11, further comprising:

increasing, by the controller, a capacity of the secondary cache by adding a new bank to the secondary cache; and after adding the new bank to the secondary cache, updating, by the controller, the first digest and the second digest.

15. A non-transitory computer-readable data storage medium storing computer-executable code that a controller executes to perform a method comprising:

calculating a first digest value for first data from a first address of a secondary cache, the secondary cache for a primary cache that is to cache the first data, the secondary cache to cache the first data at the first address within a first bank of the secondary cache;

calculating a second digest value for second data from a second address of the secondary cache, the primary cache to cache the second data, the secondary cache to cache the second data at the second address within a second bank of the secondary address;

storing the first digest value, the second digest value, the first address, and the second address within the primary cache; and associating the first digest value with the first bank and the second digest value with the second bank so as to avoid contention between the first digest value and the second digest value.

16. The non-transitory computer-readable data storage medium of claim 15, wherein the method further comprises:

controlling transfer of data between the primary cache and the secondary cache using a digest value and a digest value-bank association for the data.

17. The non-transitory computer-readable data storage medium of claim 16, wherein controlling the transfer of the data comprises:

calculating the digest value of the data;

searching the primary cache for an address of the secondary cache at which the data is stored from the digest value of the data;

when there is contention between the digest value of the data and a digest value of different data, using the digest value-bank association for the data to resolve the contention;

reading the data from the secondary cache at the address at which the data is stored.

18. The non-transitory computer-readable data storage medium of claim 15, wherein the method further comprises:

increasing a capacity of the secondary cache by adding a new bank to the secondary cache; and after adding the new bank to the secondary cache, updating the first digest and the second digest.

* * * * *